US010554675B2

(12) United States Patent
Jain et al.

(10) Patent No.: US 10,554,675 B2
(45) Date of Patent: Feb. 4, 2020

(54) MICROSERVICE INTEGRATION FABRICS NETWORK INTRUSION DETECTION AND PREVENTION SERVICE CAPABILITIES

(71) Applicant: International Business Machines Corporation, Armonk, NY (US)

(72) Inventors: Vinit Jain, Austin, TX (US); Sudheesh S. Kairali, Kozhikode (IN); Vijay R. Kalangumvathakkal, Bangalore (IN); Madhuri Madhavan Pillai, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 15/850,077

(22) Filed: Dec. 21, 2017

(65) Prior Publication Data

US 2019/0199738 A1 Jun. 27, 2019

(51) Int. Cl.
*H04L 29/06* (2006.01)
*H04L 29/08* (2006.01)
*H04L 12/26* (2006.01)

(52) U.S. Cl.
CPC ........ *H04L 63/1416* (2013.01); *H04L 43/028* (2013.01); *H04L 63/0281* (2013.01);
(Continued)

(58) Field of Classification Search
CPC ............. H04L 63/1416; H04L 67/2871; H04L 63/1425; H04L 63/20; H04L 67/2895;
(Continued)

(56) References Cited

U.S. PATENT DOCUMENTS 6,854,063 B1* 2/2005 Qu ...................... H04L 63/0245
370/392
7,953,855 B2* 5/2011 Jayawardena ...... H04L 63/1408
370/401
(Continued)

FOREIGN PATENT DOCUMENTS

CN 106991035 A 7/2017
WO 2017/062610 A1 4/2017

OTHER PUBLICATIONS

"Next-Generation Intrusion Prevention System—NGIPS", https://www.trendmicro.com/en_us/business/products/network/integrated-atp/next-gen-intrusion-prevention-system.html, Copyright 2017 Trend Micro, 10 pages.
(Continued)

*Primary Examiner* — David J Pearson
*Assistant Examiner* — Badridot Champakesanatusptodotgov
(74) *Attorney, Agent, or Firm* — William H. Hartwell; Hunter E. Webb; Keohane & D'Alessandro PLLC

(57) ABSTRACT

Aspects of the present invention provide an approach for providing network intrusion detection and prevention service (NIDPS) capabilities to a microservice in a networked computing environment. In an embodiment, a set of rules for accessing the microservice is retrieved. A NIDPS microservice is created within the environment of the microservice fabric that supports the microservice using the set of rules. The NIDPS microservice is established as a proxy communications destination for communications to the microservice such that communications that are intended for the microservice are instead rerouted to the NIDPS microservice. These communications are filtered by the NIDPS microservice according to the set of rules (e.g., to remove any communications that are determined to be threats).

17 Claims, 12 Drawing Sheets

(52) U.S. Cl.
CPC .......... *H04L 63/1425* (2013.01); *H04L 63/20* (2013.01); *H04L 67/2814* (2013.01); *H04L 67/2871* (2013.01); *H04L 67/2895* (2013.01)

(58) Field of Classification Search
CPC ............... H04L 63/0281; H04L 43/028; H04L 67/2814; H04L 43/0876
USPC ............................................................ 726/1
See application file for complete search history.

(56) References Cited

U.S. PATENT DOCUMENTS

| | | | | |
|---|---|---|---|---|
| 8,613,089 | B1* | 12/2013 | Holloway | H04L 63/1458 726/23 |
| 9,276,955 | B1* | 3/2016 | Jain | H04L 63/1458 |
| 9,294,415 | B2* | 3/2016 | Cohen | H04L 67/32 |
| 9,294,442 | B1* | 3/2016 | Lian | H04L 63/20 |
| 9,361,581 | B2* | 6/2016 | Cutler | G06N 5/025 |
| 9,525,697 | B2* | 12/2016 | Woolward | G06F 21/552 |
| 9,716,617 | B1* | 7/2017 | Ahuja | H04L 67/1031 |
| 10,158,672 | B2* | 12/2018 | Shieh | H04L 63/20 |
| 2006/0190997 | A1* | 8/2006 | Mahajani | H04L 63/0227 726/10 |
| 2010/0251329 | A1* | 9/2010 | Wei | H04L 63/1408 726/1 |
| 2013/0276092 | A1* | 10/2013 | Sun | H04L 63/0227 726/13 |
| 2016/0308821 | A1* | 10/2016 | Siba | H04L 61/2007 |
| 2016/0359720 | A1* | 12/2016 | Li | H04L 45/02 |
| 2017/0078247 | A1 | 3/2017 | Woolward et al. | |
| 2017/0286267 | A1* | 10/2017 | Jain | G06F 11/3664 |

OTHER PUBLICATIONS

"Snort—Network Intrusion Detection & Prevention System", https://www.snort.org/, Sep. 28, 2017, 6 pages.

Suricata, Open Source IDS / IPS / NSM engine, https://suricata-ids.org/, Printed Oct. 2, 2017, 1 page.

Aaruni Goel et al., "The Approaches to Amalgamate the Anti-Network Attacks Technologies in Intrusion Detection and Prevention Systems", IOSR Journal of Computer Engineering, vol. 16, Issue 3, Ver. VI (May-Jun. 2014), pp. 23-27, www.iosrjournals.org.

* cited by examiner

MICROSERVICE INTEGRATION FABRICS NETWORK INTRUSION DETECTION AND PREVENTION SERVICE CAPABILITIES

TECHNICAL FIELD

The subject matter of this invention relates generally to network communications. More specifically, aspects of the present invention provide a solution for providing network intrusion detection and prevention service (NIDPS) capabilities to a microservice in a network computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver services online via a remote server, which can be accessed via a web service and/or software, such as a web browser. Individual clients can run virtual machines (VMs) that utilize these services and store the data in the networked computing environment. This can allow a single physical server to host and/or run many VMs utilizing many services simultaneously.

Services that are employed (e.g., for Enterprise Applications) in the networked computing environment have traditionally been built as single units, referred to as monolithic services. These monolithic services often include numerous functional elements within a single process. To this extent, monolithic services often include a single database having all of the information necessary for all of the functional elements within a common database management system. In addition, the monolithic services usually include a single logical executable for all of the functional elements. However, monolithic services suffer from the fact that resources must be allocated to run the entire service even when only one or a small subset of the functionality of the service is required. Further, updates or other changes that may only affect one or a small number of functional elements in the service nevertheless require the entire service to be rebuilt and redeployed.

To this extent, one type of service that has recently been gaining popularity in the network computing environment is called a microservice. In contrast to monolithic services, microservices put each functional element into a separate service. This separate service contains only the functional and database elements necessary to perform the particular function. Further, these microservices can be combined into a microservice chain that combines multiple microservices when multiple functions are required.

One solution for deploying a microservice uses a technology called a microservice integration fabric (hereafter "microservice fabric"). A microservice fabric allows faster development, more control, and better resiliency of microservices without impacting existing implementation code. To this extent, utilization of a microservice fabric allows developers to avoid the time-consuming task of connecting the microservices, and instead lets them focus on application logic and advanced DevOps capabilities such as systematic resiliency testing, red/black deployment, and canary testing necessary for rapid experimentations and insight.

SUMMARY

In general, aspects of the present invention provide an approach for providing network intrusion detection and prevention service (NIDPS) capabilities to a microservice in a networked computing environment. In an embodiment, a set of rules for accessing the microservice are retrieved. A NIDPS microservice is created within the environment of the microservice fabric that supports the microservice using the set of rules. The NIDPS microservice is established as a proxy communications destination for communications to the microservice such that communications that are intended for the microservice are instead rerouted to the NIDPS microservice. These communications are filtered by the NIDPS microservice according to the set of rules (e.g., to remove any communications that are determined to be threats).

One aspect of the invention provides a method for providing network intrusion detection and prevention service (NIDPS) capabilities to a microservice in a networked computing environment, comprising: retrieving a set of rules for accessing the microservice; creating a NIDPS microservice within a microservice fabric of the microservice using the set of rules; establishing the NIDPS microservice as a proxy communications destination for communications to the microservice such that the communications that are intended for the microservice are rerouted to the NIDPS microservice; and filtering the communications intended for the microservice by the NIDPS microservice according to the set of rules.

Another aspect of the invention provides a computer system for providing network intrusion detection and prevention service (NIDPS) capabilities to a microservice in a networked computing environment, the computer system comprising: a memory medium comprising instructions; a bus coupled to the memory medium; and a processor coupled to the bus that when executing the instructions cause the system to: retrieve a set of rules for accessing the microservice; create a NIDPS microservice within an environment of a microservice fabric that supports the microservice using the set of rules; establish the NIDPS microservice as a proxy communications destination for communications to the microservice such that the communications that are intended for the microservice are rerouted to the NIDPS microservice; and filter the communications intended for the microservice by the NIDPS microservice according to the set of rules.

Yet another aspect of the invention provides a computer program product embodied in a computer readable medium that, when executed by a computer device, performs a method for providing network intrusion detection and prevention service (NIDPS) capabilities to a microservice in a networked computing environment, the method comprising: retrieving a set of rules for accessing the microservice; creating a NIDPS microservice within a microservice fabric of the microservice using the set of rules; establishing the NIDPS microservice as a proxy communications destination for communications to the microservice such that the communications that are intended for the microservice are rerouted to the NIDPS microservice; and filtering the communications intended for the microservice by the NIDPS microservice according to the set of rules.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings.

Figure 1:
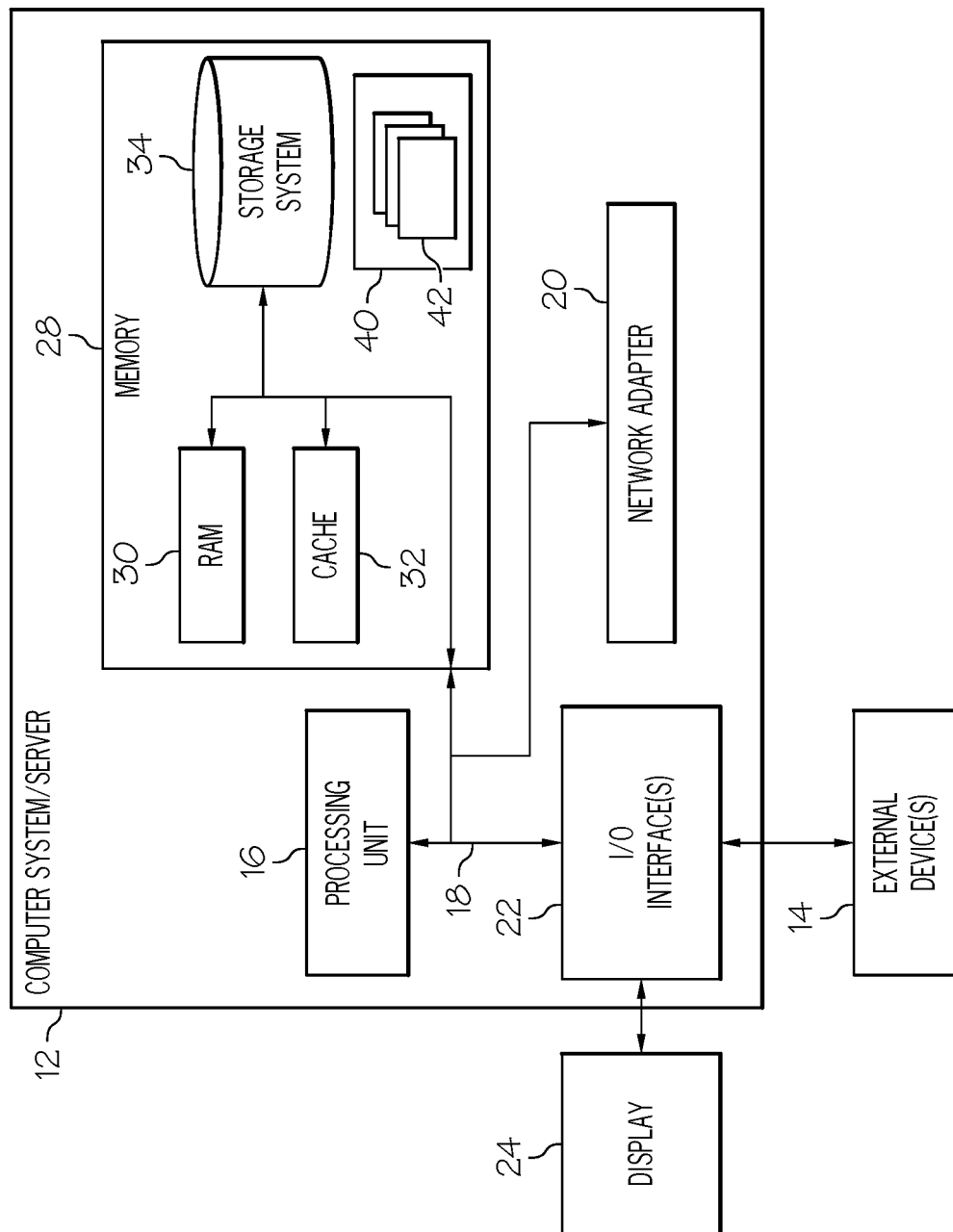
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for providing network intrusion detection and prevention service (NIDPS) capabilities to a microservice in a networked computing environment. In an embodiment, a set of rules for accessing the microservice are retrieved. A NIDPS microservice is created within the environment of the microservice fabric that supports the microservice using the set of rules. The NIDPS microservice is established as a proxy communications destination for communications to the microservice such that communications that are intended for the microservice are instead rerouted to the NIDPS microservice. These communications are filtered by the NIDPS microservice according to the set of rules (e.g., to remove any communications that are determined to be threats).

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows.

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a computerized implementation 10 (e.g., a cloud computing node) is shown. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
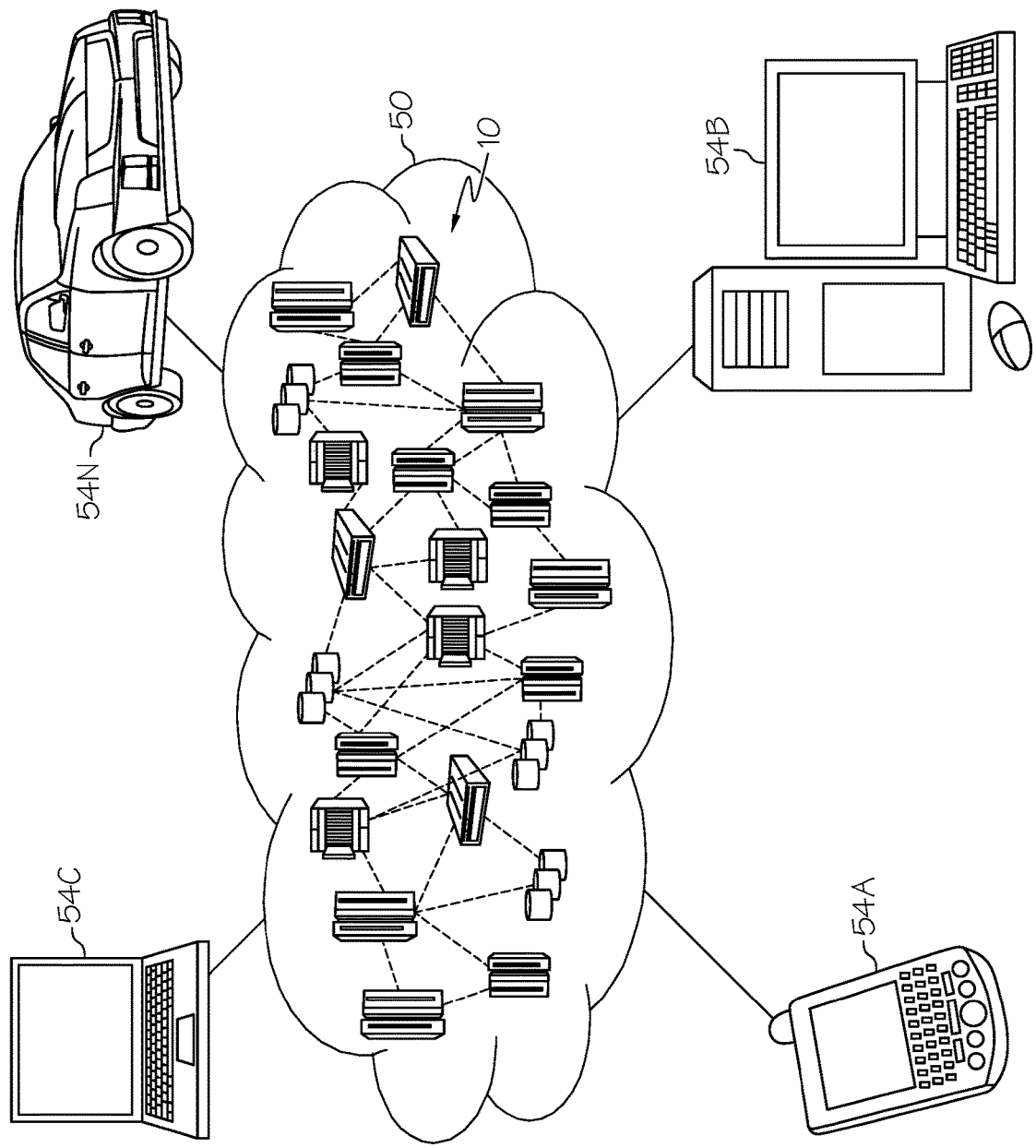
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes (e.g., utilizing computerized implementation 10) with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
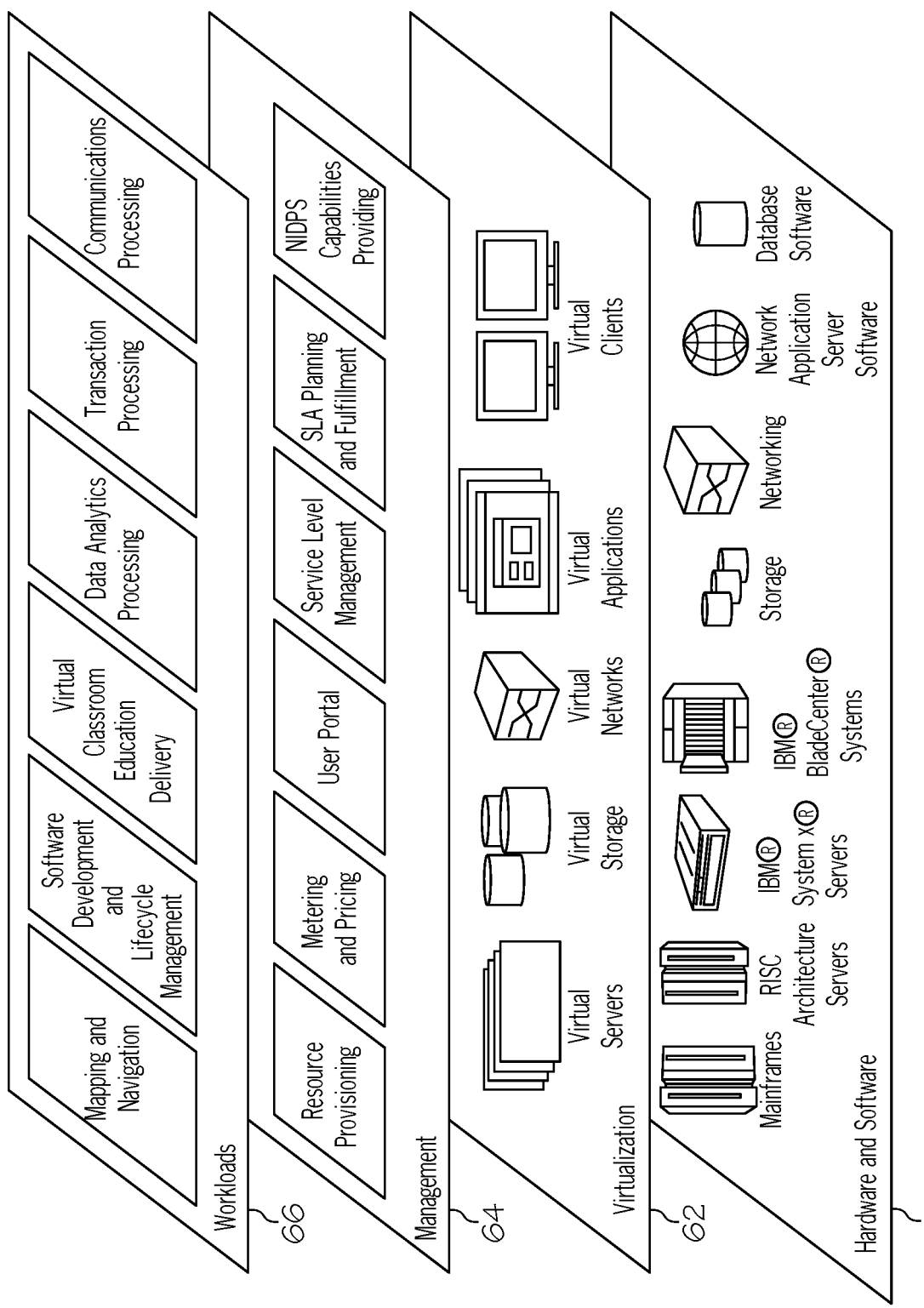
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer 64 is NIDPS capabilities providing, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and communications processing. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
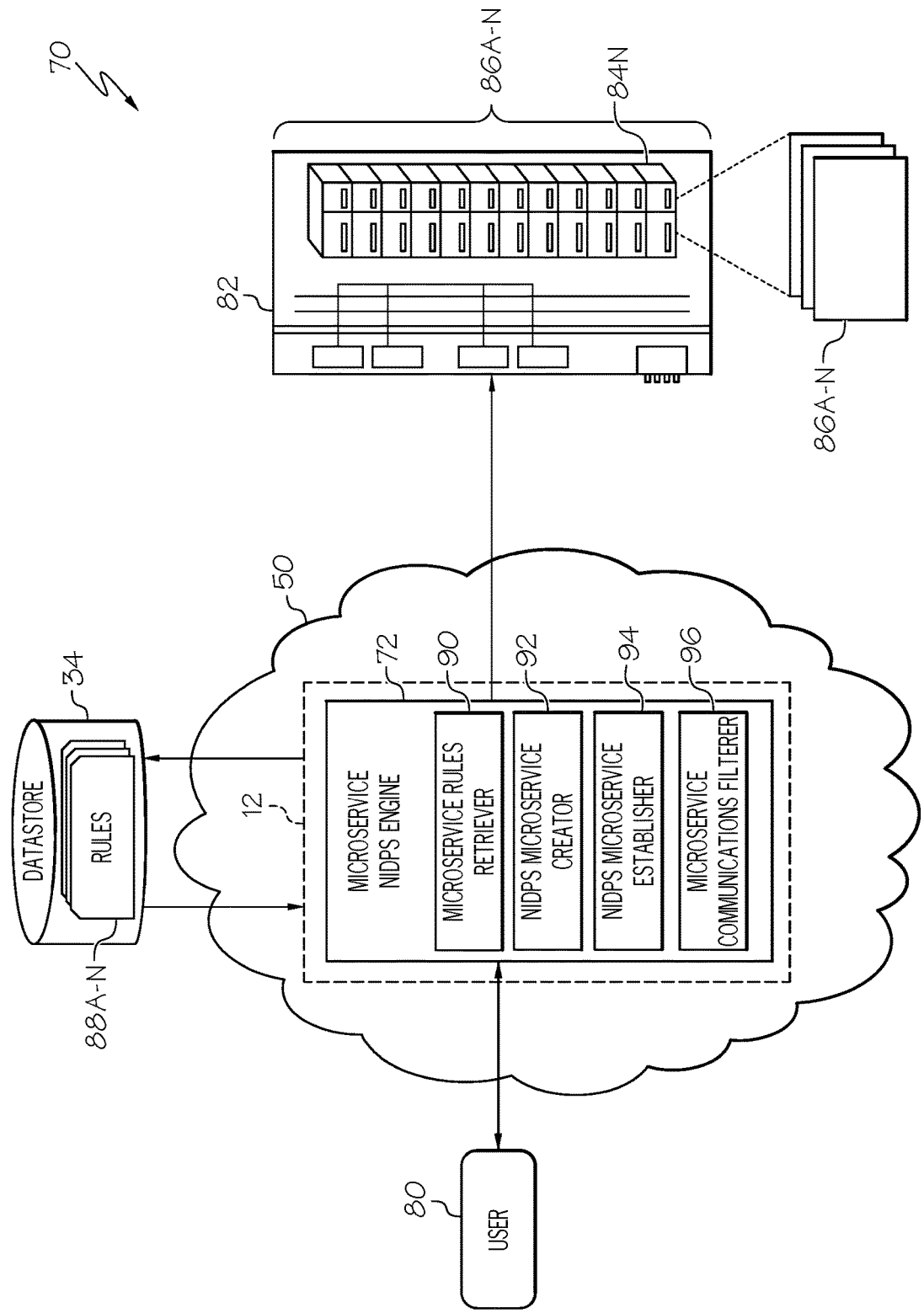
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment). A stand-alone computer system/server 12 is shown in FIG. 4 for illustrative purposes only. In the event the teachings recited herein are practiced in a networked computing environment 70, each physical server 82 need not have a microservice NIDPS engine (hereinafter "system 72"). Rather, system 72 could be loaded on a server or server-capable device that communicates (e.g., wirelessly) with the physical server 82 to provide SDN communications therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can provide NIDPS capabilities for one or more microservices 86A-N (e.g., executing in a computing node 84N of a plurality of computing nodes 84A-N) on physical server 82 in a networked computing environment 70. To accomplish this, system 72 can include: a microservice rules retriever 90, a NIDPS microservice creator 92, a NIDPS microservice establisher 94, and a microservice communications filterer 96.

As shown, physical server 82 can host and/or provide one or more microservices 86A-N (generically 86N), which can be hosted and/or provided for within a number of computing nodes 84A-N. Computing nodes 84A-N can be or include a traditional virtual machine (VM) instance. Such a VM instance can be included in a computing node 84N as a virtual server on physical server 82. It should be understood that a VM instance is different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, a VM instance is a virtual system that simulates an entire computing environment. To this extent, rather than performing only a single task, a VM instance is an environment, can include an operating system, middleware, one or more applications, and/or the like, within which a variety of tasks, functions, operations, etc., can be carried out by a user, such as by executing one or more applications thereon. As such, a VM instance can be made to simulate a stand-alone computer system in the eyes of a user. In any case, one or more of computing nodes 84A-N on physical service 82 can be configured as a microservice environment which can run one of more microservices 86A-N.

Figure 5:
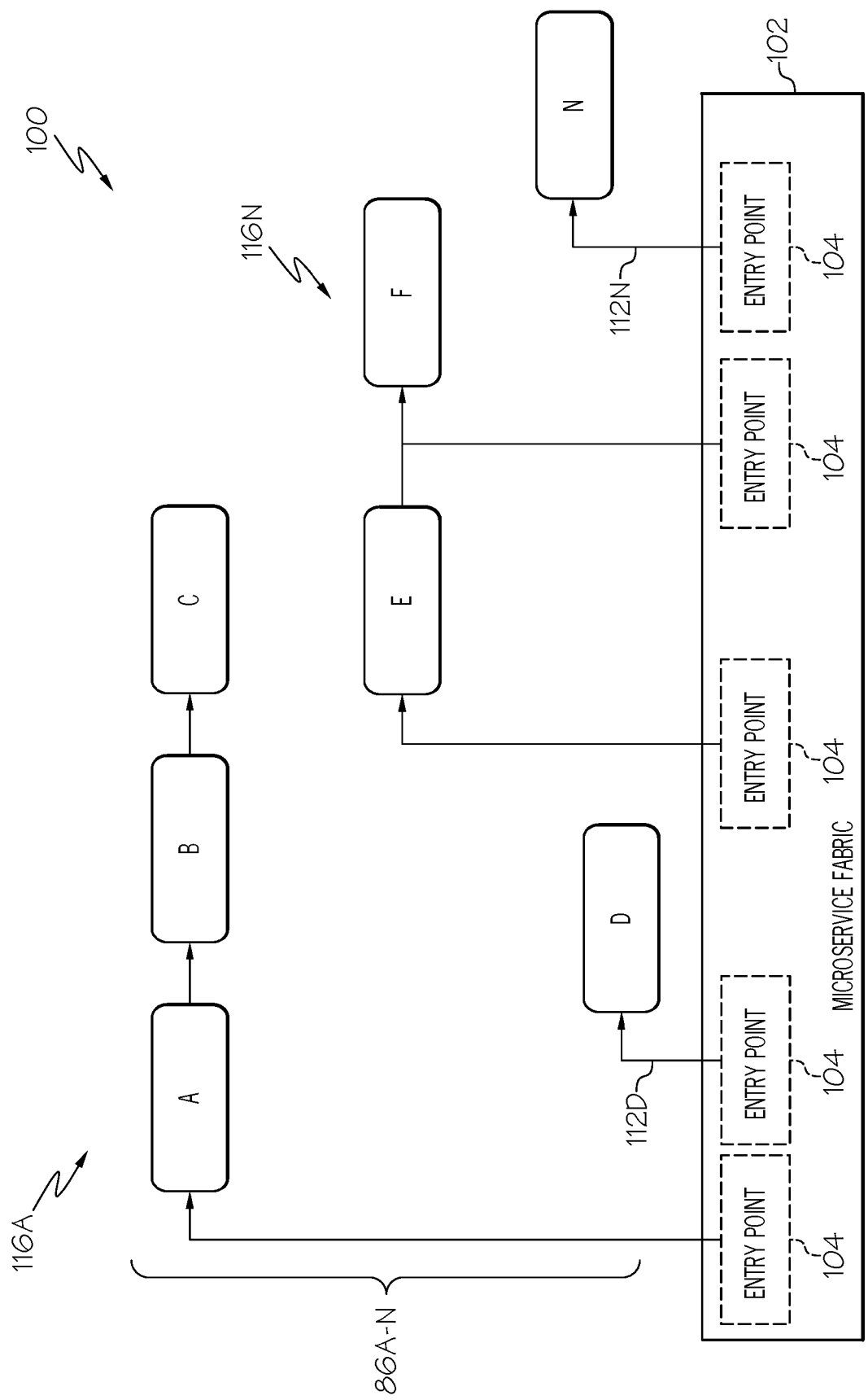
FIG. 5 depicts an example microservice environment according to an embodiment of the present invention.

Referring now to FIG. 5, an example microservice environment 100 is shown according to an embodiment of the invention. As shown, microservice environment 100 (e.g., within computing node 84N of FIG. 4) has the ability to run one or more microservices 86A-N. In addition, microservice environment 100 has the ability to run one or more microservice chains 116A-N (generically 116N), which can have one or more microservices 86A-N arranged together (e.g., in sequence) so that the functionalities thereof can operate in tandem. Further, microservice environment 100 can include a microservice fabric 102. In an embodiment, microservice fabric 102 can be an Amalgam8 microservice fabric. In any case, as stated above, each microservice 86N contains only the programmatic and data elements necessary for the microservice 86N to perform its function. To this extent, microservice fabric 102 provides generic functions (e.g., interface, inter-service communications, external communications, etc.) that would normally be performed by a monolithic service. Further, microservice fabric 102 can provide a user interface that allows a user 80 to be able to create and/or host a particular microservice 86N and/or to connect a number of microservices 86A-N into a microservice chain 116N. Further, microservice fabric 102 can manage communications into a microservice 86N and/or between microservices 86A-N. To accomplish this, microservice fabric 102 can include entry points 104 to one or more microservices 86A-N and/or microservice chains 116A-N.

The inventors of the invention described herein have discovered certain deficiencies in the current solutions for managing a microservice 86N. For example, because the microservice environment 100 emphasizes using microservices 86A-N in which elements that are not essential are not present, microservices 86A-N are often unable to perform activities that might otherwise be performed by a monolithic service. One such activity is monitoring of incoming communications to detect potential threats. In addition, there is often no support from microservice fabric 102 controllers to provide NPS/NIDS (Network Intrusion Detection and Prevention) components. This is particularly true for closely related micro services which are taking part in a micro service chain that is weaved and for which a common support is often needed. Further, even if microservice fabric 102 were to provide NDSPS support, the constantly changing landscape of computer-based threats would require constant updates to the microservice fabric 102, causing downtime and disruption to the overall system. Still further, there is currently no solution for providing different protection levels to different microservices 86A-N in the same microservice fabric 102.

Certain embodiments of the present invention may offer various technical computing advantages, including the ability to provide customized NIDPS capabilities to a microservice 86N, which may not have been possible under previous solutions. The structures used to provide the NIDPS capabilities are external to the microservice 86N itself, allowing the microservice 86N to remain compact and eliminating the need to change the microservice 86N in order to update the NIDPS capabilities. Further, the structures used to provide the NIDPS capabilities are also not internal to the microservice fabric 102, removing the disadvantages inherent in these types of solutions. To this extent, the current solution provides threat detection and prevention in a way that provides flexibility and customization while preserving the compactness and efficiency inherent in the microservice environment, maximizing the usage of computer resources.

To this extent, referring again to FIG. 4, microservice rules retriever 90 of system 72, as executed by computer system/server 12, is configured to retrieve a set of rules 88A-N (e.g., from datastore 34) for accessing microservice 86N. Each of the sets of rules 88A-N (generically 88N) can include rules 88N that specify trusted sources, sources of known threats, code signatures, and/or any other types of rules 88N for identifying unwanted communications and/or communications threats in the network environment that are now known or later discovered. Further, data store 34 can include different sets of rules 88A-N that are specifically tailored for the particular microservice 86N for which NIDPS services are being provided. For example, one set of rules 88A could be strict in which communications are allowed to be forwarded to a particular microservice 86A, while a second set of rules 86B could be less restrictive based on the needs of a different microservice 88B. Similarly, one set of rules 88C could be specifically designed to be used in conjunction with microservices 86A-N that perform a particular function (e.g., financial), while a different set of rules 88D could be designed for use with microservices 86A-N that perform a different function (e.g., personnel).

In any case, referring again to FIG. 4 in conjunction with FIG. 5, NIDPS microservice creator 92 of system 72, as executed on computer system/server 12, is configured to create a NIDPS microservice that runs within microservice fabric 102 using the set of rules 88N. In an embodiment, the NIDPS microservice is itself a microservice 86N that runs on microservice fabric 102. Alternatively, the NIDPS microservice can be a non-microservice application that runs within microservice environment 100. In either case, the NIDPS microservice created by NIDPS microservice creator 92 is a stand-alone component, and not integrated into microservice fabric 102 or part of another microservice 86N. Whatever the case, the NIDPS microservice acts as an entry point for traffic to one or more microservices 86A-N and/or applications which need protection from network intrusion. To accomplish this, each NIDPS microservice can analyze incoming traffic using rules 88N to allow only safe/secure traffic in the microservice(s) 86A-N that it protects, as will be explained further.

Figure 6:
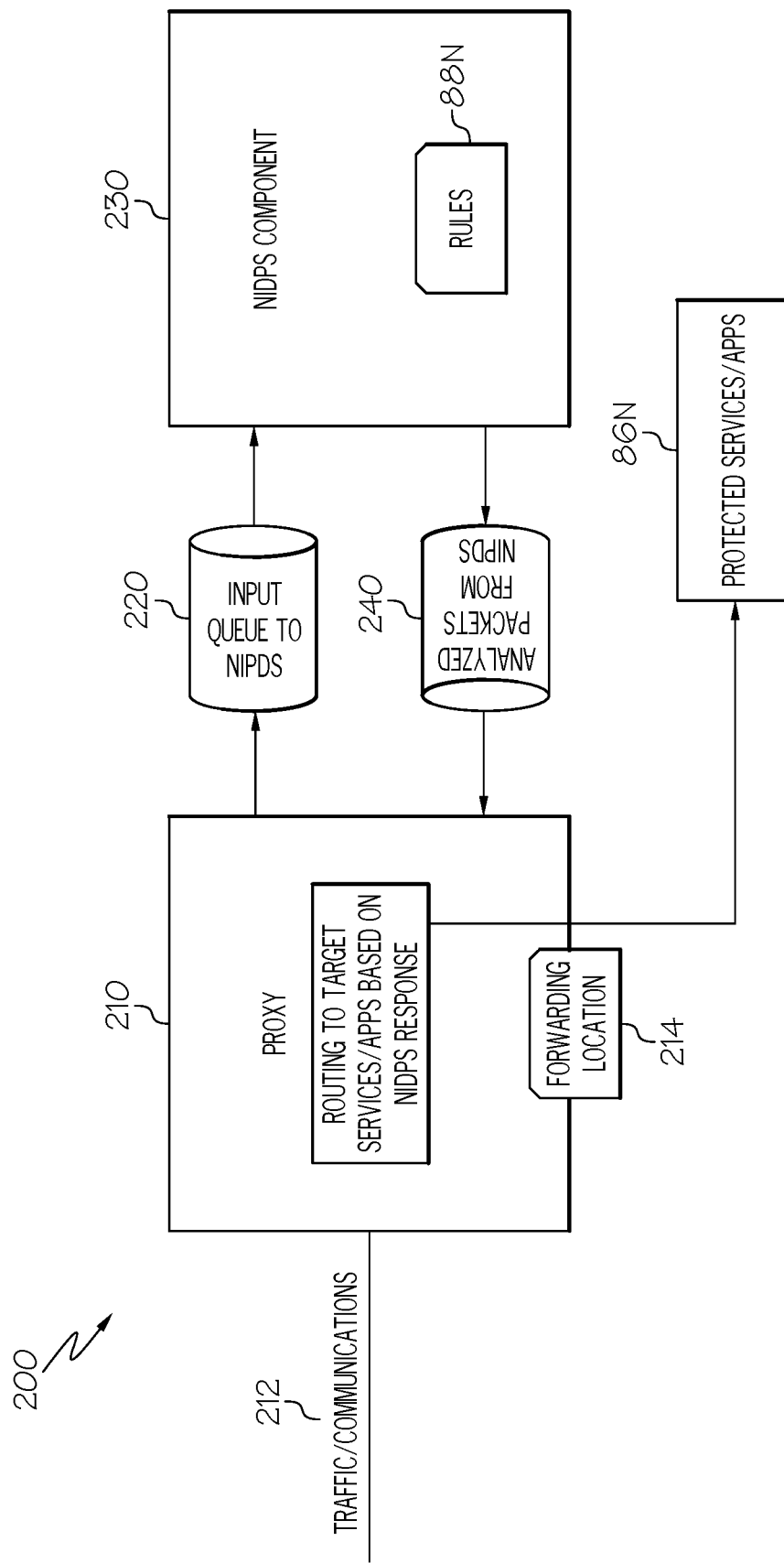
FIG. 6 depicts an example NIDPS microservice environment according to an embodiment of the present invention.

Referring now to FIG. 6, an example NIDPS microservice 200 is shown according to an embodiment of the present invention. As shown NIDPS microservice 200 includes a proxy component 210. Proxy component 210 is the entry point for the NIDPS microservice 200 (e.g., utilizing proxies such as NGINX). To this extent, proxy component 210 may expose ports of various protocols it supports—generally https (443) and http (80)—to intercept communications within incoming traffic 212 that are directed to microservice 86N and forward the communications to NIDPS component 230 (e.g., by depositing the communications into an input queue 220 that allows NIDPS component 230 to analyze the packets included in communications 212 based on its current capacity). In any case, NIDPS component 230 analyzes the packets based on rules 88N (e.g., using a service such as Snort, Suricata, and/or the like). Based on the analysis, NIDPS component 230 may reject the traffic 212 or it may allow the traffic 212. Only allowed traffic 212 will be routed back to proxy component 210. Once NIDPS component 230 has analyzed the traffic, it routes back packets that are safe to route to protected services back to proxy component 210 (e.g., via an output queue 240). Proxy component 210 then routes the communication to microservice 86N, which is being protected from the intrusion, using route information for microservice 86N (e.g., stored in proxy component 210).

Referring again to FIG. 4 in conjunction with FIGS. 5 and 6, NIDPS microservice establisher 94 of system 72, as executed by computer system/server 12, is configured to establish NIDPS microservice 200 as a proxy communication destination for communications 212 to microservice. In an embodiment, NIDPS microservice establisher 94 locates an entry point 104 for the microservice 86N that is stored in microservice fabric 102. This entry point 104 in microservice fabric 102 is replaced with a proxy location that points to NIDPS microservice 200 such that communications 212 that are intended for microservice 86N are instead rerouted to NIDPS microservice 200 (e.g., proxy component 210 thereof). A forwarding location 214 field in NIDPS microservice 200 (e.g., proxy component 210 thereof) is set to the entry point 104 of microservice 86N so that approved communications 212 can be routed to microservice 86N.

To this extent, NIDPS microservice 200 is not required to be a permanent part of microservice environment 100, but can be removed (e.g., for replacement with an updated version, replacement with a different NIDPS microservice 200 based on a different set of rules 88N, etc.) using the same process used to establish the NIDPS microservice 200 within the microservice environment 100. To do so, the entry point 104 of microservice 86N can be retrieved from NIDPS microservice 200. This entry point 104 can be restored in microservice fabric 102 by replacing the proxy location that points to NIDPS microservice 200. Then, in cases in which NIDPS microservice 200 is no longer being utilized by any other microservices 86A-N, NIDPS microservice 200 can be removed (e.g., deleted) from microservice environment 100 in which microservice fabric 102 is operating.

Figure 7A:
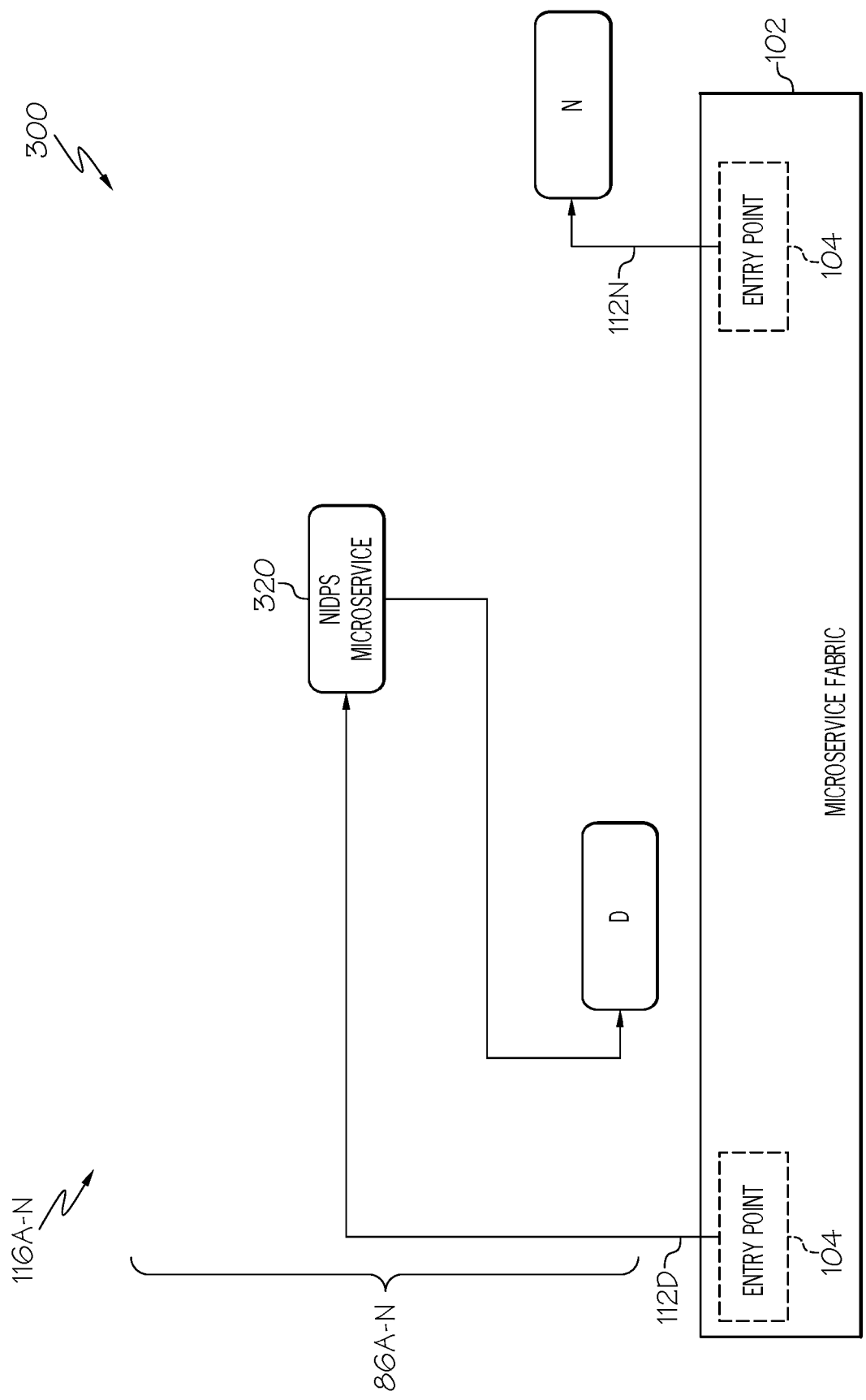
FIGS. 7A-B depict an example establishing of a NIDPS microservice as a proxy according to an embodiment of the present invention.
Figure 7B:
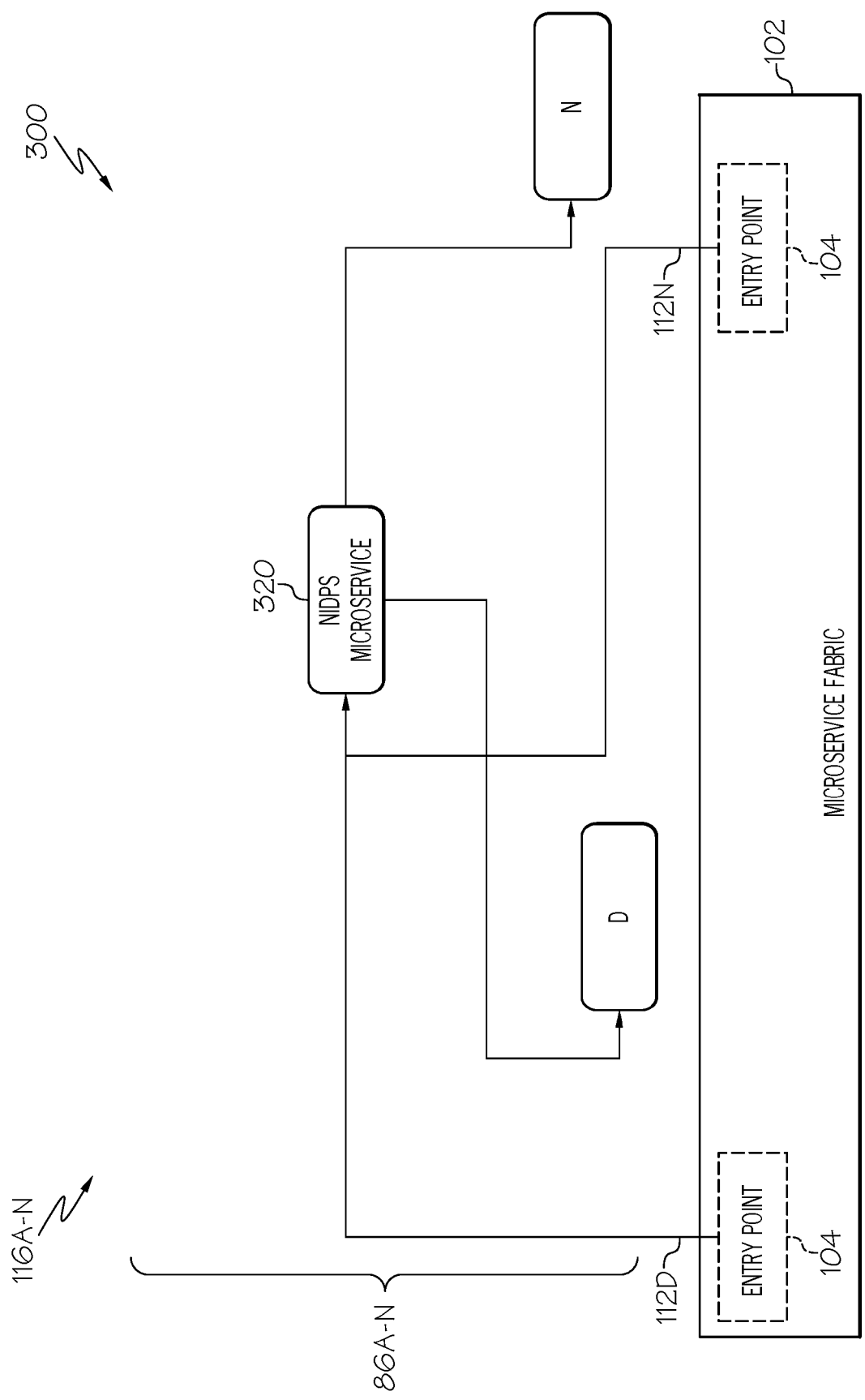

Referring now to FIGS. 7A-B, an example establishing 300 of NIDPS microservice 320 as a proxy is shown according to an embodiment of the present invention. As shown, two microservices 86D, 86N (which were also present in FIG. 5) have been highlighted. Further, NIDPS microservice 320 has been created (e.g., using a set of rules 88N that are appropriate for microservices 86D, 86N) within the environment in which microservice fabric 102 is operational. As shown, in FIG. 7A, entry point 104 corresponding to microservice 86D has been changed, as evidenced by the changing of pointer 112D to point to NIDPS microservice 320, establishing NIDPS microservice 320 as the proxy communications destination for communications to microservice 86D. Similarly, as shown, in FIG. 7B, entry point 104 corresponding to microservice 86N has also been changed, as evidenced by the changing of pointer 112N to point to NIDPS microservice 320, establishing NIDPS microservice 320 as the proxy communications destination for communications to microservice 86N. To this extent, the same set of rules 88N can be used to filter communications to multiple independently operating microservices 86D, 86N.

Figure 8:
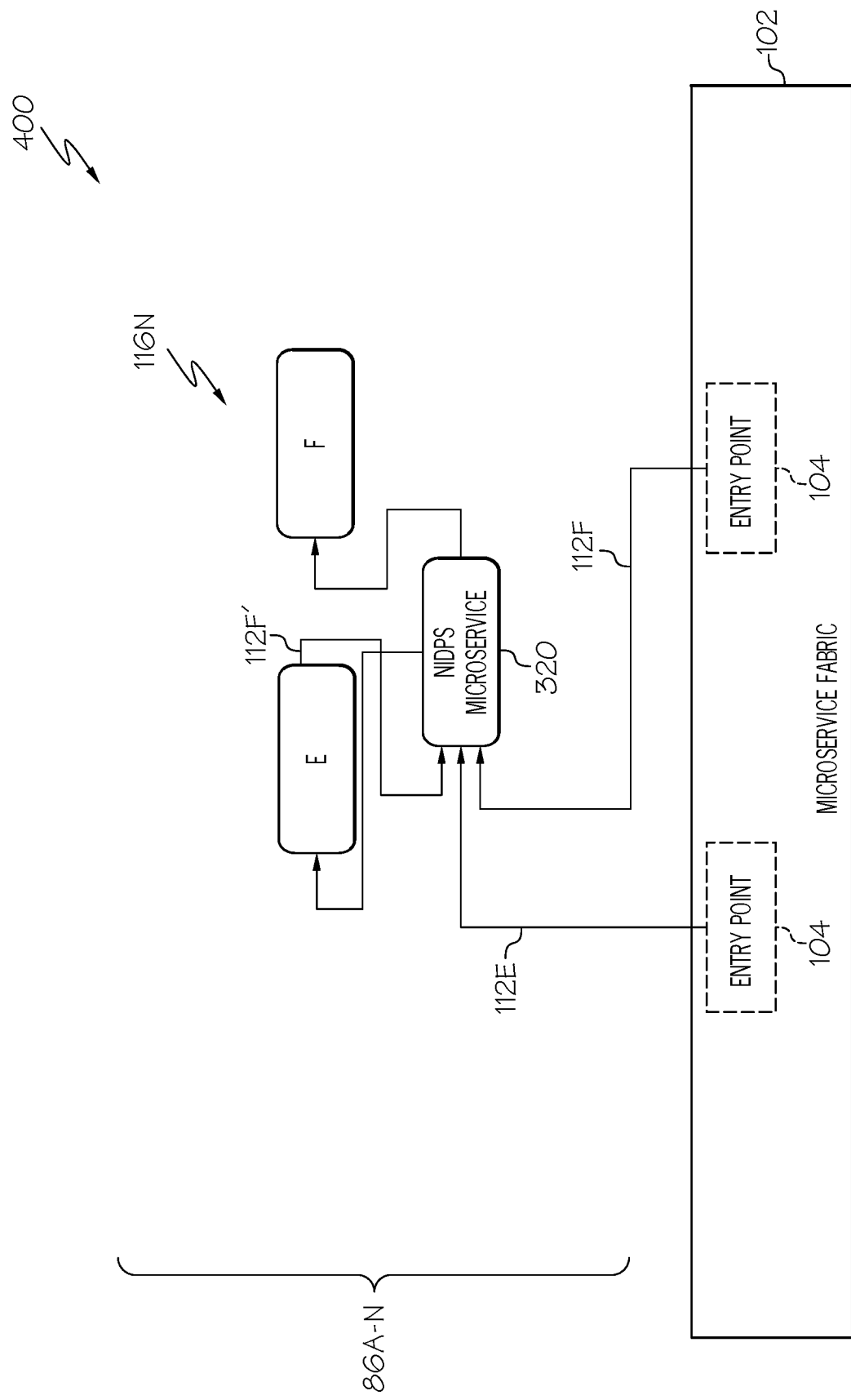
FIG. 8 depicts an example establishing of a NIDPS microservice as a proxy according to an embodiment of the present invention.

Referring now to FIG. 8, another example establishing 400 of a NIDPS microservice 320 as a proxy is shown according to an embodiment of the present invention. As shown, a microservice chain 116N including two microservices 86E, 86F (which were also present in FIG. 5) have been highlighted. As in the previous example, NIDPS microservice 320 has been created (e.g., using a set of rules 88N that are appropriate for microservices 86E, 86F) within the environment in which microservice fabric 102 is operational. As shown, entry point 104 corresponding to microservice 86E has been changed, as evidenced by the changing of pointer 112E to point to NIDPS microservice 320, establishing NIDPS microservice 320 as the proxy communications destination for communications to microservice 86E. Similarly, as shown, entry point 104 corresponding to microservice 86F has also been changed, as evidenced by the changing of pointer 112F to point to NIDPS microservice 320, establishing NIDPS microservice 320 as the proxy communications destination for communications to microservice 86F. However, in addition, NIDPS microservice 320 has also been established as the proxy destination for communications from microservice 86E to microservice 86F, as evidenced by the changing of pointer 112F' to point to NIDPS microservice 320. To this extent, NIDPS microservice 320 can monitor for threats in communications that flow through microservice fabric 102 (e.g., external communications) as well as in communications between microservices 86E, 86F in the same microservice chain 116N (e.g., internal communications).

Figure 9:
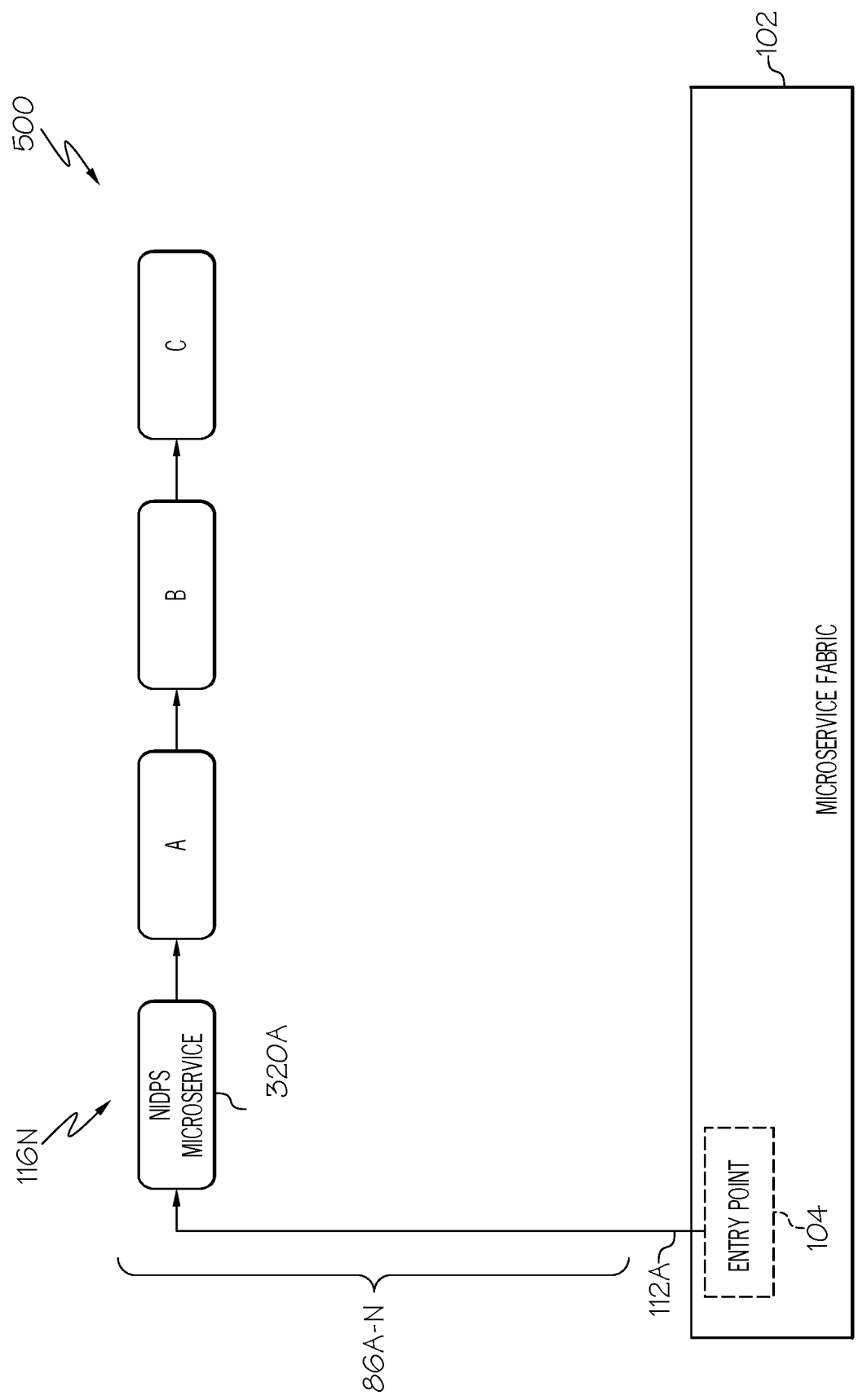
FIG. 9 depicts an example establishing of a NIDPS microservice as a proxy according to an embodiment of the present invention.

Referring now to FIG. 9, another example establishing 500 of a NIDPS microservice 320 as a proxy is shown according to an embodiment of the present invention. As shown, a microservice chain 116A including three microservices 86A, 86B, 86C (which were also present in FIG. 5) have been highlighted. As in the previous examples, NIDPS microservice 320 has been created (e.g., using a set of rules 88N that are appropriate for microservices 86A, 86B, 86C) within the environment in which microservice fabric 102 is operational. As shown, entry point 104 corresponding to microservice 86A has been changed, as evidenced by the changing of pointer 112A to point to NIDPS microservice 320, establishing NIDPS microservice 320 as the proxy communications destination for communications to microservice 86A. To this extent, NIDPS microservice 320 monitors for threats in communications that flow into microservice chain 116A through microservice fabric 102 (e.g., external communications) but does not monitor for threats in communications between microservices 86A, 86B, 86C in the same microservice chain 116A (e.g., internal communications).

Figure 10:
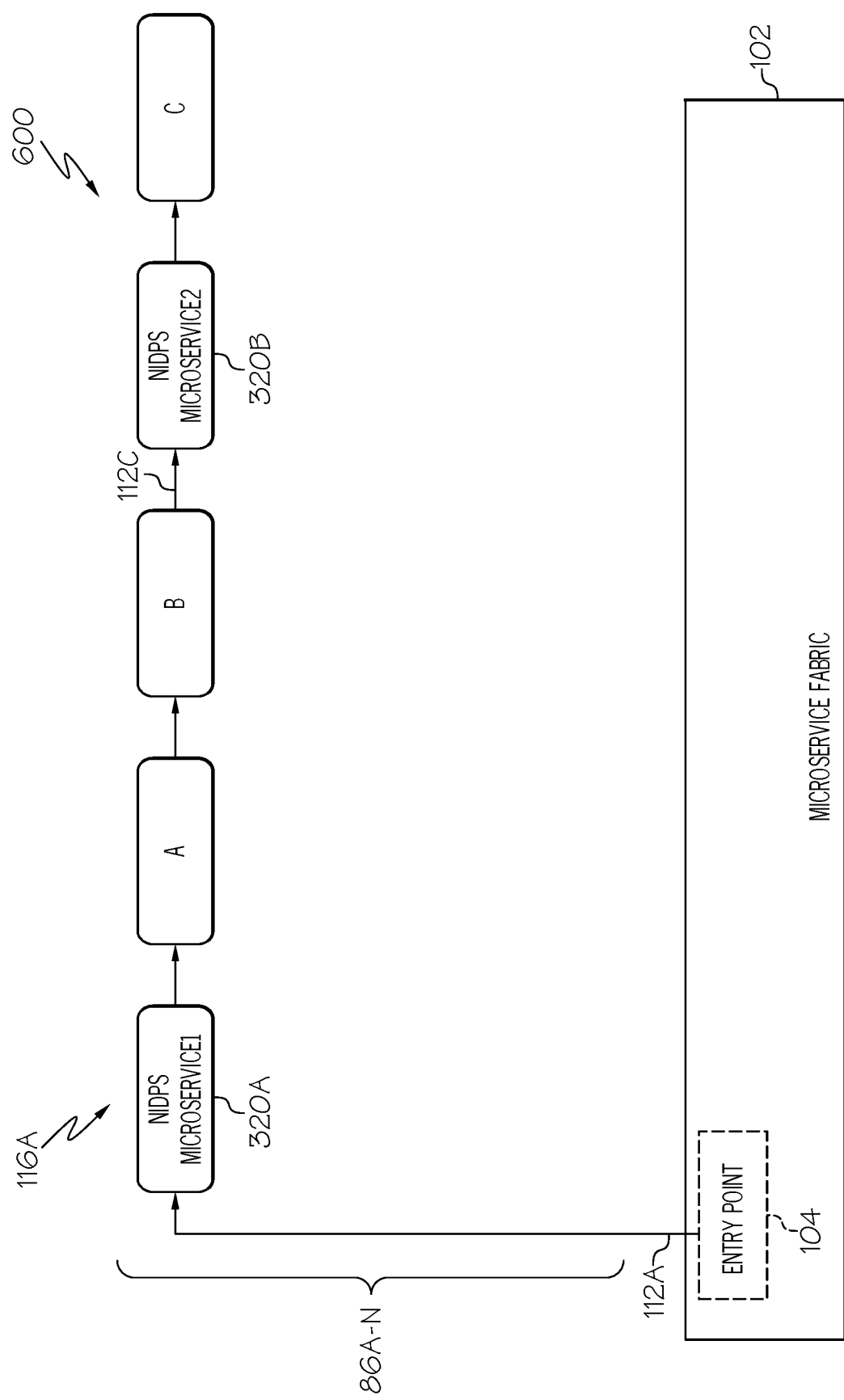
FIG. 10 depicts an example establishing of a NIDPS microservice as a proxy according to an embodiment of the present invention.

Referring now to FIG. 10, another example establishing 600 of a NIDPS microservice 320 as a proxy is shown according to an embodiment of the present invention. As in FIG. 9, entry point 104 corresponding to microservice 86A has been changed, as evidenced by the changing of pointer 112A to point to NIDPS microservice 320A, establishing NIDPS microservice 320A as the proxy communications destination for communications to microservice 86A, causing NIDPS microservice 320 to monitor for threats in communications that flow into microservice chain 116A through microservice fabric 102 (e.g., external communications). However, in addition, a second NIDPS microservice 320B has been created (e.g., using a set of rules 88N that are appropriate for microservice 86C) within the environment in which microservice fabric 102 is operational. NIDPS microservice 320B has been established as the proxy destination for communications from microservice 86B to microservice 86C, as evidenced by the changing of pointer 112C to point to NIDPS microservice 320B. To this extent, NIDPS microservice 320A can monitor for threats in communications that flow through microservice fabric 102 (e.g., external communications) into microservice chain 116A using one (e.g., less strict) set of rules 88A, while NIDPS microservice 320B monitors communications between microservice 86B and 86C in the same microservice chain 116N (e.g., internal communications) using a different (e.g., more strict) set of rules 88B.

Referring again to FIG. 4 in conjunction with FIG. 6, microservice communications filterer 96 of system 72, as executed by computer system/server 12, is configured to filter the communications 112 intended for microservice 86N by NIDPS microservice 200 (e.g., NIDPS component 230 thereof) according to rules 88N. To accomplish this, NIDPS component 230 of NIDPS microservice 200 analyzes each communication based on rules 88N. All communications 112 that do not satisfy rules 88N are determined to be unwanted communications (e.g., threats, etc.) and are discarded by NIDPS microservice 200. Further, in response to the detection of such a communication, microservice communications filterer 96 can additionally forward an alert (e.g., to user 80) that such a communication has been detected. Conversely, communications that satisfy rules 88N can be forwarded on to microservice 86N by NIDPS microservice 200 (e.g., proxy component 210 thereof), as they have been determined not to be threats.

Figure 11:
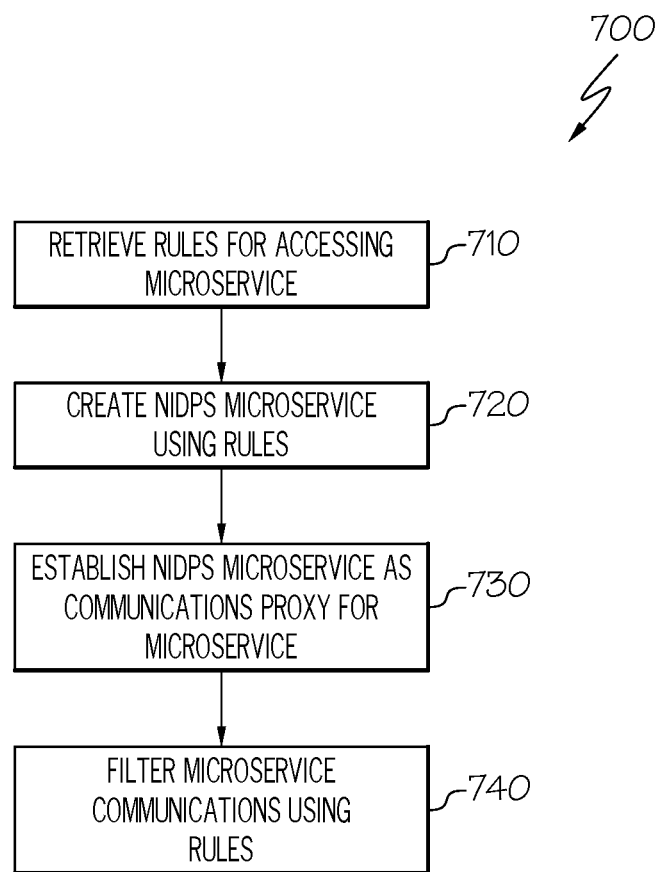
FIG. 11 depicts an example process flowchart according to an embodiment of the present invention.

Referring now to FIG. 11 in conjunction with FIGS. 4 and 7A, a process flowchart 700 according to an embodiment of the present invention is shown. At 710, microservice rules retriever 90 of system 72, as executed by computer system/server 12, retrieves a set of rules 88N for accessing microservice 86N. At 720, NIDPS microservice creator 92, as executed by computer system/server 12, creates NIDPS microservice 320 within microservice fabric 102 of microservice 86N using rules 88N. At 730, NIDPS microservice establisher 94, as executed by computer system/server 12, establishes NIDPS microservice 320 as a proxy communications destination for communications 112 to microservice 86N. This makes it such that communications that are intended for microservice 86N are rerouted to NIDPS microservice 320. At 740, microservice communications filterer 96, as executed by computer system/server 12, filters communications 112 intended for microservice 86N by NDIPS microservice 320 according to rules 88N.

The process flowchart of FIG. 11 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for providing network intrusion detection and prevention service (NIDPS) capabilities to a microservice in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for providing NIDPS capabilities. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for providing NIDPS capabilities to a microservice in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for providing network intrusion detection and prevention service (NIDPS) capabilities to a microservice in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for providing network intrusion detection and prevention service (NIDPS) capabilities to a microservice in a networked computing environment, comprising:
   retrieving a set of rules for accessing the microservice;
   creating a NIDPS microservice within an environment of a microservice fabric that supports the microservice using the set of rules;
   establishing the NIDPS microservice as a proxy communications destination for communications to the microservice such that the communications that are intended for the microservice are rerouted to the NIDPS microservice;
   filtering the communications intended for the microservice by the NIDPS microservice according to the set of rules;
   creating a second NIDPS microservice having a second set of rules within an environment of the microservice fabric that supports the microservice; and
   inserting the second NIDPS microservice between the microservice and a subsequent microservice in a microservice chain,
   wherein the second NIDPS microservice filters communications between the microservice and the subsequent microservice using the second set of rules.

2. The method of claim 1, wherein the NIDPS microservice is a microservice.

3. The method of claim 1, the establishing further comprising:
   locating an entry point for the microservice stored in the microservice fabric;
   replacing the entry point in the microservice fabric with a proxy location of the NIDPS microservice; and
   setting a forwarding location of the NIDPS microservice to the entry point for the microservice.

4. The method of claim 1, the filtering further comprising:
   discarding, by the NIDPS microservice, a communication that is determined to be a threat based on the set of rules; and
   forwarding, by the NIDPS microservice, a communication that is determined not to be a threat based on the set of rules to the microservice.

5. The method of claim 1, further comprising:
   establishing the NIDPS microservice as the proxy communications destination for communications to a second microservice in the microservice fabric, the second microservice operating separately from the microservice; and
   filtering a second set of communications intended for the second microservice by the NIDPS microservice according to the set of rules.

6. The method of claim 1,
   wherein the microservice is one of a plurality of microservices in the microservice chain, and
   wherein the NIDPS microservice provides NIDPS capabilities to all of the plurality of microservices in the microservice chain.

7. A computer system for providing network intrusion detection and prevention service (NIDPS) capabilities to a microservice in a networked computing environment, the computer system comprising:
   a memory medium comprising instructions;
   a bus coupled to the memory medium; and
   a processor coupled to the bus that when executing the instructions cause the system to:
   retrieve a set of rules for accessing the microservice;
   create a NIDPS microservice within an environment of a microservice fabric that supports the microservice using the set of rules;
   establish the NIDPS microservice as a proxy communications destination for communications to the microservice such that the communications that are intended for the microservice are rerouted to the NIDPS microservice;
   filter the communications intended for the microservice by the NIDPS microservice according to the set of rules;
   create a second NIDPS microservice having a second set of rules within an environment of the microservice fabric that supports the microservice; and insert the second NIDPS microservice between the microservice and a subsequent microservice in a microservice chain, wherein the second NIDPS microservice filters communications between the microservice and the subsequent microservice using the second set of rules.

8. The system of claim 7, wherein the NIDPS microservice is a microservice.

9. The system of claim 7, the instructions that cause the system to establish further causing the system to:

locate an entry point for the microservice stored in the microservice fabric;

replace the entry point in the microservice fabric with a proxy location of the NIDPS microservice; and set a forwarding location of the NIDPS microservice to the entry point for the microservice.

10. The system of claim 7, the SDN, the instructions that cause the system to filter further causing the system to:

discard, by the NIDPS microservice, a communication that is determined to be a threat based on the set of rules; and forward, by the NIDPS microservice, a communication that is determined not to be a threat based on the set of rules to the microservice.

11. The system of claim 7, the instructions further causing the system to:

establish the NIDPS microservice as the proxy communications destination for communications to a second microservice in the microservice fabric, the second microservice operating separately from the microservice; and filter a second set of communications intended for the second microservice by the NIDPS microservice according to the set of rules.

12. The system of claim 7, wherein the microservice is one of a plurality of microservices in the microservice chain, and wherein the NIDPS microservice provides NIDPS capabilities to all of the plurality of microservices in the microservice chain.

13. A computer program product embodied in a non-transitory computer readable medium that, when executed by a computer device, performs a method for providing network intrusion detection and prevention service (NIDPS) capabilities to a microservice in a networked computing environment, the method comprising:

retrieving a set of rules for accessing the microservice;

creating a NIDPS microservice within a microservice fabric of the microservice using the set of rules;

establishing the NIDPS microservice as a proxy communications destination for communications to the microservice such that the communications that are intended for the microservice are rerouted to the NIDPS microservice;

filtering the communications intended for the microservice by the NIDPS microservice according to the set of rules;

creating a second NIDPS microservice having a second set of rules within an environment of the microservice fabric that supports the microservice; and inserting the second NIDPS microservice between the microservice and a subsequent microservice in a microservice chain, wherein the second NIDPS microservice filters communications between the microservice and the subsequent microservice using the second set of rules.

14. The program product of claim 13, the establishing further comprising:

locating an entry point for the microservice stored in the microservice fabric;

replacing the entry point in the microservice fabric with a proxy location of the NIDPS microservice; and setting a forwarding location of the NIDPS microservice to the entry point for the microservice.

15. The program product of claim 13, the filtering further comprising:

discarding, by the NIDPS microservice, a communication that is determined to be a threat based on the set of rules; and forwarding, by the NIDPS microservice, a communication that is determined not to be a threat based on the set of rules to the microservice.

16. The program product of claim 13, the method further comprising:

establishing the NIDPS microservice as the proxy communications destination for communications to a second microservice in the microservice fabric, the second microservice operating separately from the microservice; and filtering a second set of communications intended for the second microservice by the NIDPS microservice according to the set of rules.

17. The program product of claim 13, wherein the microservice is one of a plurality of microservices in the microservice chain, and wherein the NIDPS microservice provides NIDPS capabilities to all of the plurality of microservices in the microservice chain.

\* \* \* \* \*